(12) United States Patent
Sasaki et al.

(10) Patent No.: US 10,700,432 B2
(45) Date of Patent: Jun. 30, 2020

(54) LOOP ANTENNA ARRAY

(71) Applicant: Nippon Telegraph and Telephone Corporation, Tokyo (JP)

(72) Inventors: Ai-ichiro Sasaki, Atsugi (JP); Akihiko Hirata, Atsugi (JP); Souichi Oka, Atsugi (JP); Fumiharu Morisawa, Atsugi (JP); Osamu Kagami, Atsugi (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 16/079,622

(22) PCT Filed: Sep. 1, 2016

(86) PCT No.: PCT/JP2016/075655
§ 371 (c)(1),
(2) Date: Aug. 24, 2018

(87) PCT Pub. No.: WO2017/158869
PCT Pub. Date: Sep. 21, 2017

(65) Prior Publication Data
US 2019/0058253 A1  Feb. 21, 2019

(30) Foreign Application Priority Data

Mar. 15, 2016  (JP) .................. 2016-050671

(51) Int. Cl.
*H01Q 7/00* (2006.01)
*H01Q 21/00* (2006.01)
(Continued)

(52) U.S. Cl.
CPC ........... *H01Q 7/00* (2013.01); *H01Q 21/0075* (2013.01); *H01Q 21/24* (2013.01); *H04B 5/0081* (2013.01)

(58) Field of Classification Search
CPC ...... H01Q 7/00; H01Q 21/24; H01Q 21/0075; H04B 5/0081
See application file for complete search history.

(56) References Cited

U.S. PATENT DOCUMENTS 4,866,455 A * 9/1989 Lichtblau ................. H01Q 7/04
343/742
5,061,941 A  10/1991 Lizzi
(Continued)

FOREIGN PATENT DOCUMENTS

EP  1511121 A1  3/2005
JP  04-248704 A  9/1992
(Continued)

OTHER PUBLICATIONS

Office Action, Korean Patent Application No. 10-2018-7020906, dated May 15, 2019.
(Continued)

*Primary Examiner* — Hai V Tran
*Assistant Examiner* — Michael M Bouizza
(74) *Attorney, Agent, or Firm* — Kilpatrick Townsend & Stockton LLP

(57) ABSTRACT

A loop antenna array capable of forming a clear boundary of a communication area is provided. The loop antenna array includes three loop antennas, in which a direction of a current flowing through the loop antenna arranged in the middle and a direction of a current flowing through each of the loop antennas arranged on both sides of the loop antenna arranged in the middle are opposite from each other, and the sum of magnetic moments of the three loop antennas is zero.

9 Claims, 15 Drawing Sheets

(51) Int. Cl.
*H01Q 21/24* (2006.01)
*H04B 5/00* (2006.01)

(56) References Cited

U.S. PATENT DOCUMENTS

| | | | |
|---|---|---|---|
| 6,137,447 A * | 10/2000 | Saitoh | H01Q 7/04 343/742 |
| 6,176,433 B1 | 1/2001 | Uesaka et al. | |
| 2004/0196205 A1 | 10/2004 | Shishido et al. | |
| 2011/0133726 A1 | 6/2011 | Ballantyne et al. | |
| 2013/0200721 A1 | 8/2013 | Kurs et al. | |

FOREIGN PATENT DOCUMENTS

| | | |
|---|---|---|
| JP | 11-032452 A | 2/1999 |
| JP | 2003-142927 A | 5/2003 |
| JP | 2007-174570 A | 7/2007 |
| JP | 2013-125998 A | 6/2013 |
| JP | 2014-116887 A | 6/2014 |
| JP | 2015-008383 A | 1/2015 |
| JP | 2015-508987 A | 3/2015 |
| WO | 2009/101750 A1 | 8/2009 |

OTHER PUBLICATIONS

International Search Report, PCT Application No. PCT/JP2016/075655, dated Nov. 22, 2016.
Office Action, Japanese Patent Application No. 2016-050671, dated Jul. 5, 2016.
Office Action, Japanese Patent Application No. 2016-050671, dated Nov. 22, 2016.
Office Action, Japanese Patent Application No. 2017-024589, dated Mar. 13, 2018.
International Preliminary Report on Patentability, PCT Application No. PCT/JP2016/075655, dated Sep. 27, 2018.
Office Action, Chinese Patent Application No. 201680083625.6, dated Oct. 8, 2019.
European Extended Search Report, European Patent Application No. 16894486.6, dated Oct. 22, 2019.

* cited by examiner

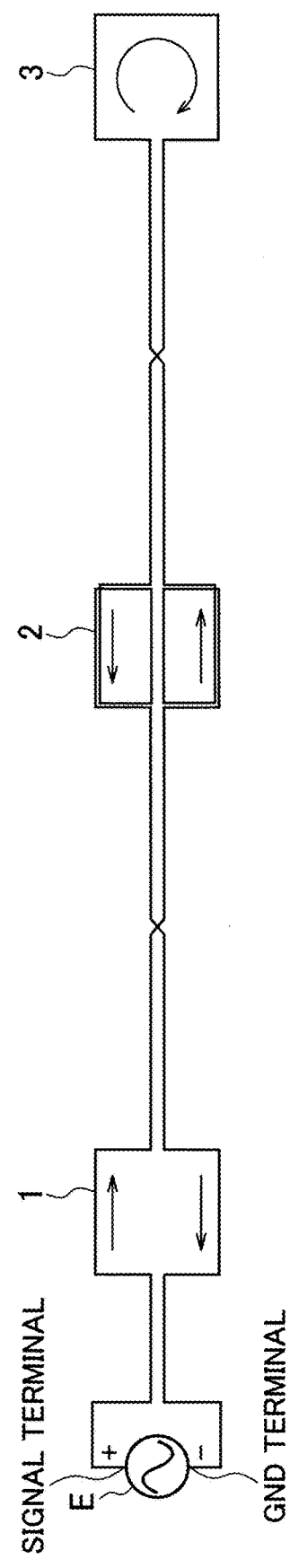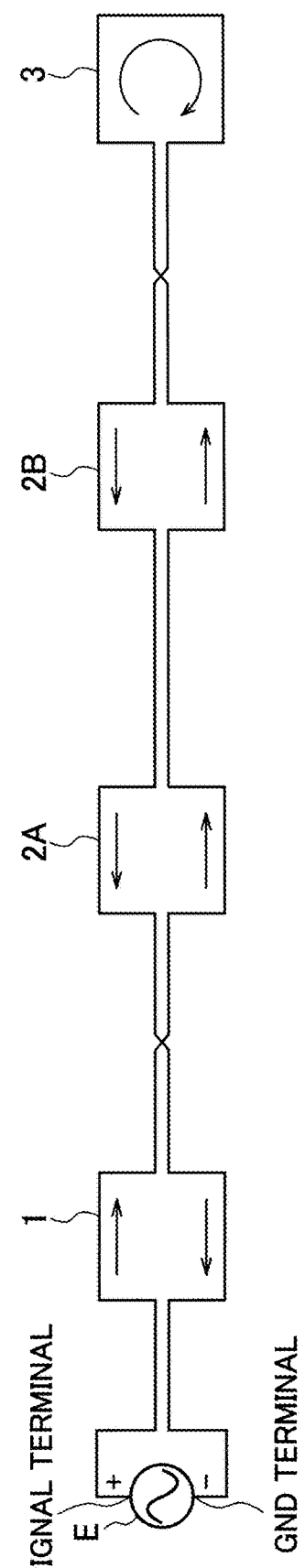

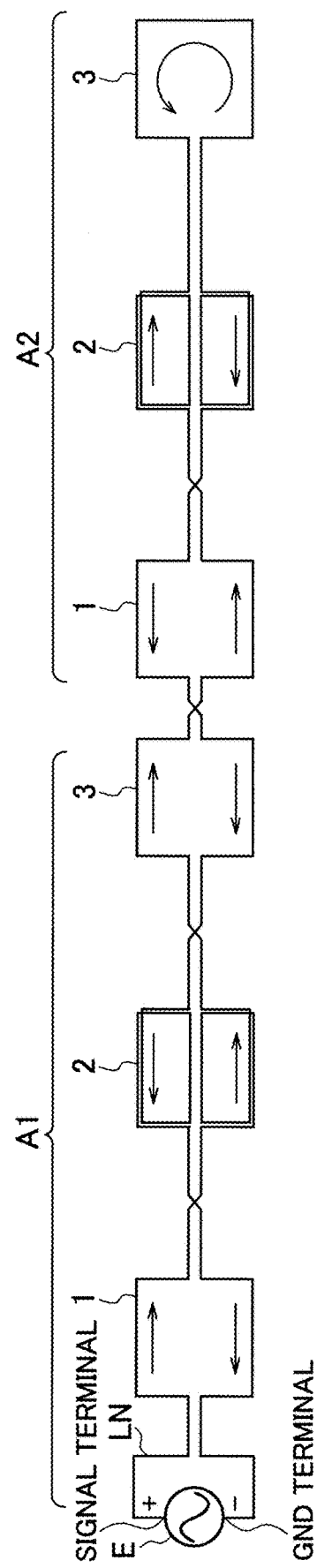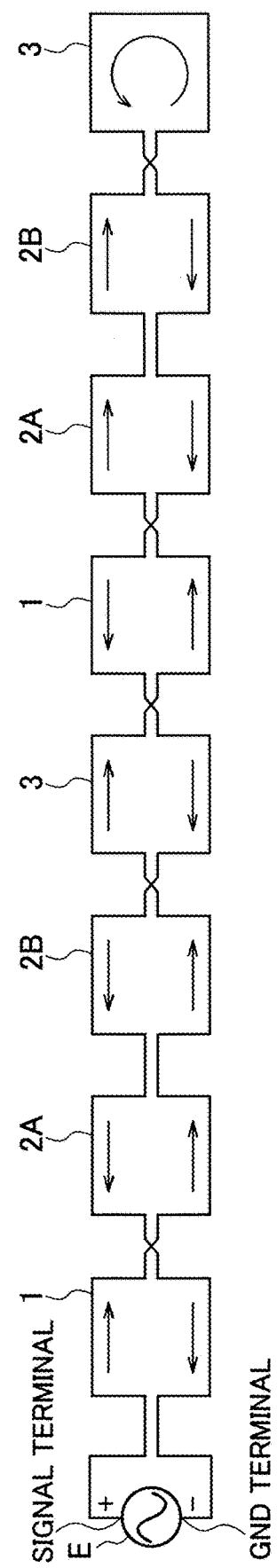

LOOP ANTENNA ARRAY

TECHNICAL FIELD

The present invention relates to a loop antenna array capable of forming a clear boundary of a communication area.

BACKGROUND ART

A demand for a radio communication system with a purposely limited communication area has recently been increasing. An electric field communication system utilizing an electric field is disclosed in Patent document 1 as such a radio communication system.

PRIOR ART DOCUMENT

Patent Document

Patent document 1: Japanese Patent Application Publication No. 2007-174570

SUMMARY OF THE INVENTION

Problem to be Solved by the Invention

In an electric field communication system, only a terminal device in an area around an installed access point device can communicate with the access point device. However, the distribution of the electric field around the access point device heavily depends on the installation environment or orientation of a user holding the terminal device. It has been thus difficult to form a clear boundary of a communication area by the electric field communication system. As a result, failure of communication of terminal devices at positions where the communication should be made or the opposite case can happen, and a stable and reliable radio communication system cannot be constructed.

The use of the electric field as a communication medium can be thought as one of the causes of such problems. This is because the distribution of the electric field is affected a lot by a surrounding conductor or dielectric.

The present invention is made in view of the above-described problems, and an objective of the present invention is to provide a loop antenna array capable of forming a clear boundary of a communication area.

Means for Solving the Problem

In order to solve the above-described problems, the loop antenna array of the present invention includes three loop antennas, in which a direction of a current flowing through the loop antenna arranged in the middle and a direction of a current flowing through each of the loop antennas arranged in both sides are opposite from each other, and the sum of magnetic moments of the loop antennas is zero.

Effect of the Invention

According to the loop antenna array of the present invention, a clear boundary of a communication area can be formed.

BRIEF DESCRIPTION OF THE DRAWINGS

FIG. 11(a) is a diagram that illustrates an example of a loop antenna array of a second embodiment, and FIG. 11(b) is a diagram that illustrates an example of a loop antenna array of a comparative example of the second embodiment. FIGS. 11(a) and 11(b) are collectively referred to as FIG. 11.

FIGS. 12(a) and 12(b) are collectively referred to as FIG. 12.

FIG. 14(a) is a diagram that illustrates an example of a loop antenna array of a fifth embodiment, and FIG. 14(b) is a diagram that illustrates an example of a loop antenna array of a comparative example of the fifth embodiment. FIGS. 14(a) and 14(b) are collectively referred to as FIG. 14.

FIGS. 15(a) and 15(b) are collectively referred to as FIG. 14.

MODE FOR CARRYING OUT THE INVENTION

Hereinafter, embodiments of the present invention are described with reference to the drawings.

A loop antenna array of this embodiment is a loop antenna array including multiple loop antennas as a type of a magnetic field antenna.

A low-frequency magnetic field (magnetic field of about 10 MHz or below) formed by the loop antenna array has a feature that interaction with a human body or a surrounding environment is significantly lower than that of an electric field. Thus, that low-frequency magnetic field is appropriate as a communication medium for forming a clear boundary of a communication area. If sharp distribution of magnetic field intensity in which the magnetic field intensity rapidly attenuates at the boundary of the communication area can be formed with the loop antenna array, the reliability of a radio communication system with a limited communication area can be increased.

A magnetic field antenna generally used for forming a magnetic field area is a one-turn loop antenna.

Figure 1:
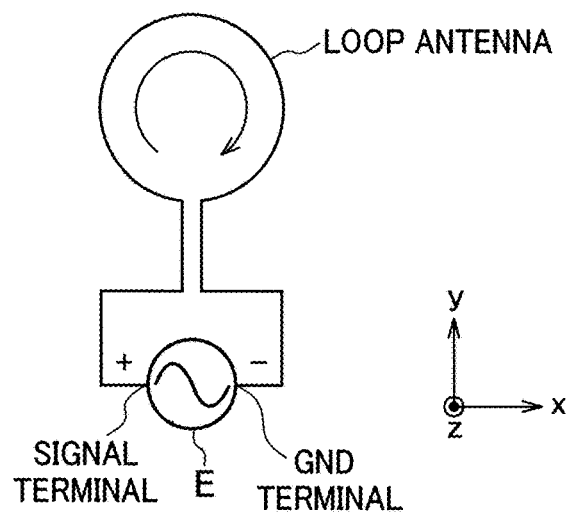
FIG. 1 is a diagram that illustrates an example of a one-turn loop antenna.

FIG. 1 is a diagram that illustrates an example of the one-turn loop antenna. For example, a + terminal of the loop antenna is connected to a signal terminal of an alternating-current source E, and a – terminal is connected to a GND terminal of the alternating-current source E. This allows an alternating-current to flow through the loop antenna.

Figure 2:
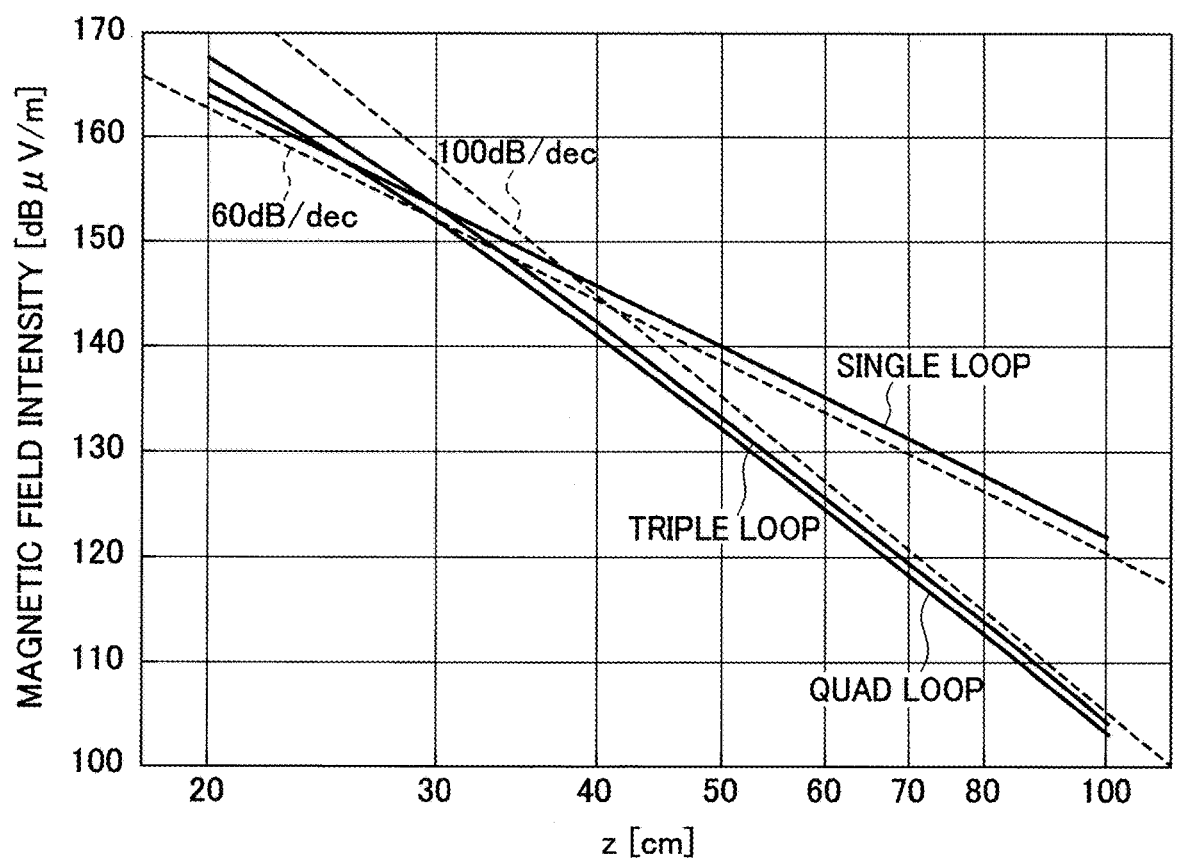
FIG. 2 is a diagram that illustrates relationship between a distance from the loop antenna in a z-axis direction and magnetic field intensity.

FIG. 2 is a diagram that illustrates relationship between a distance from the loop antenna in a z-axis direction (z [cm]) and magnetic field intensity [dBμV/m].

The property illustrated as a single loop in FIG. 2 is the property of the magnetic field intensity formed by the one-turn loop antenna, and an attenuation rate of the magnetic field intensity is 60 dB/dec. The attenuation rate of magnetic field intensity is an index indicating clarity of the boundary of the communication area, and it can be said that the higher the attenuation rate of magnetic field intensity, the clearer the boundary of the communication area.

Figure 3:
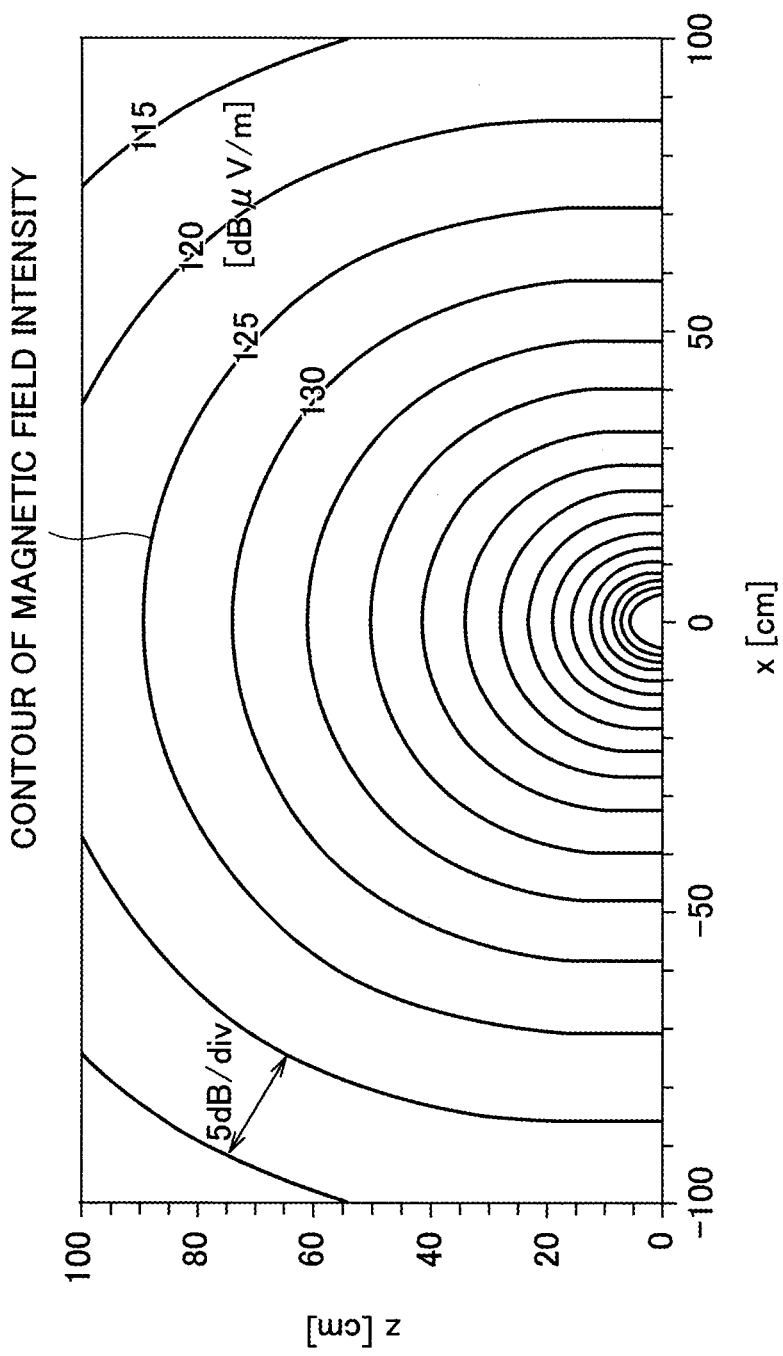
FIG. 3 is a diagram that illustrates distribution of the magnetic field intensity formed by the one-turn loop antenna.

FIG. 3 is a diagram that illustrates distribution of the magnetic field intensity formed by the one-turn loop antenna, and the horizontal axis indicates an x-axis direction in FIG. 1 while the vertical axis indicates the z-axis direction in FIG. 1. Contours of the magnetic field intensity are drawn at intervals of 5 dB (specifically, 5 dBμV/m) (5 dB/div).

As illustrated in FIG. 3, the contours of the magnetic field intensity are curved. That is, the shape of the magnetic field area is accordingly a curved surface. Thus, it is difficult to form a linear and clear boundary of the communication area with the one-turn loop antenna.

In order to form the linear and clear boundary of the communication area, the attenuation rate of magnetic field intensity of 100 dB/dec indicated in FIG. 2 is required, for example.

Figure 4:
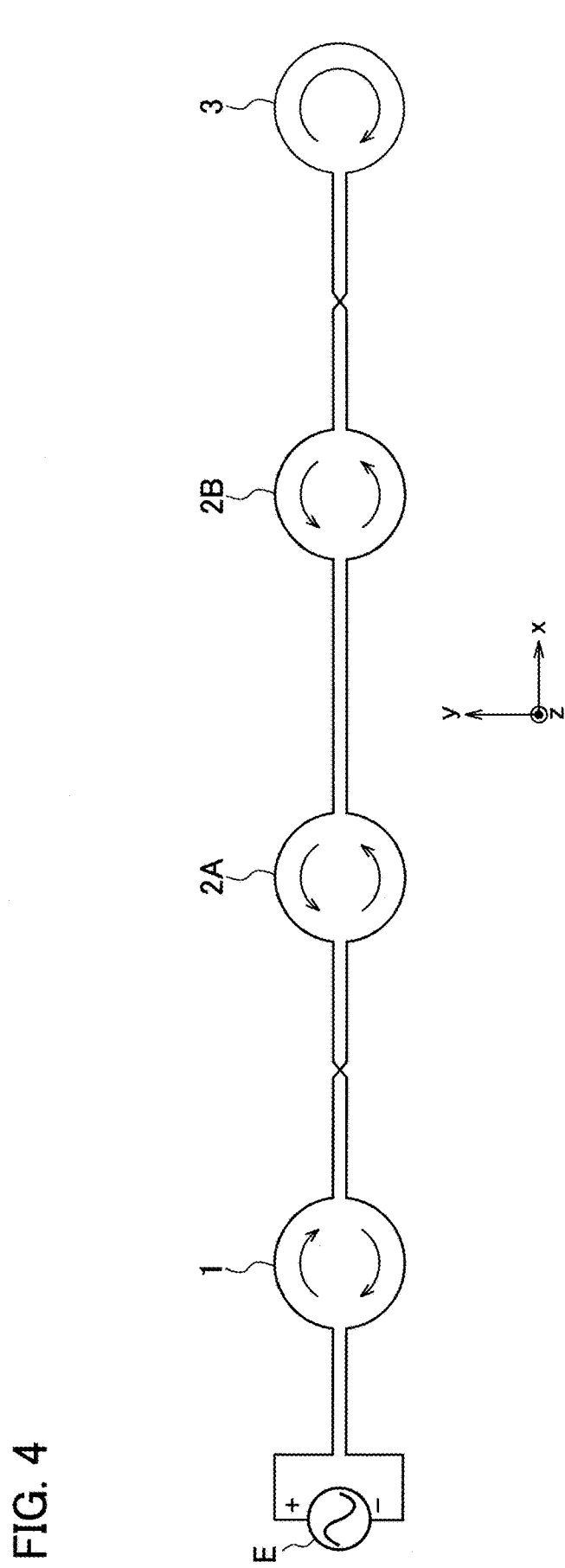
FIG. 4 is a diagram that illustrates an example of a loop antenna array for obtaining an attenuation rate of magnetic field intensity of 100 dB/dec.

FIG. 4 is a diagram that illustrates an example of a loop antenna array for obtaining the attenuation rate of magnetic field intensity of 100 dB/dec.

Such an attenuation rate of magnetic field intensity can be obtained by a loop antenna array including four loop antennas 1, 2A, 2B, and 3 as illustrated in FIG. 4. The loop antennas 1, 2A, 2B, and 3 are arranged linearly. Currents flow in the same direction through the two loop antennas 2A and 2B arranged in the middle, but though the two loop antennas 1 and 3 arranged in both ends, currents flow in a direction opposite from that of the currents flowing through the loop antennas 2A and 2B arranged in the middle.

One loop antenna can be seen as a magnetic dipole. Since currents of the same magnitude flow in the opposite directions through the loop antennas 1 and 2A as the dipoles, the loop antennas 1 and 2A can be seen as a quadrupole as a whole. Likewise, the loop antennas 2B and 3 can be seen as a quadrupole as a whole. Furthering this idea, since the two quadrupoles are aligned in the opposite directions, the loop antenna array of FIG. 4 can be seen as an octupole.

The property illustrated as a quad loop in FIG. 2 is the property of the loop antenna array illustrated in FIG. 4, and the attenuation rate of magnetic field intensity is 100 dB/dec.

Figure 5:
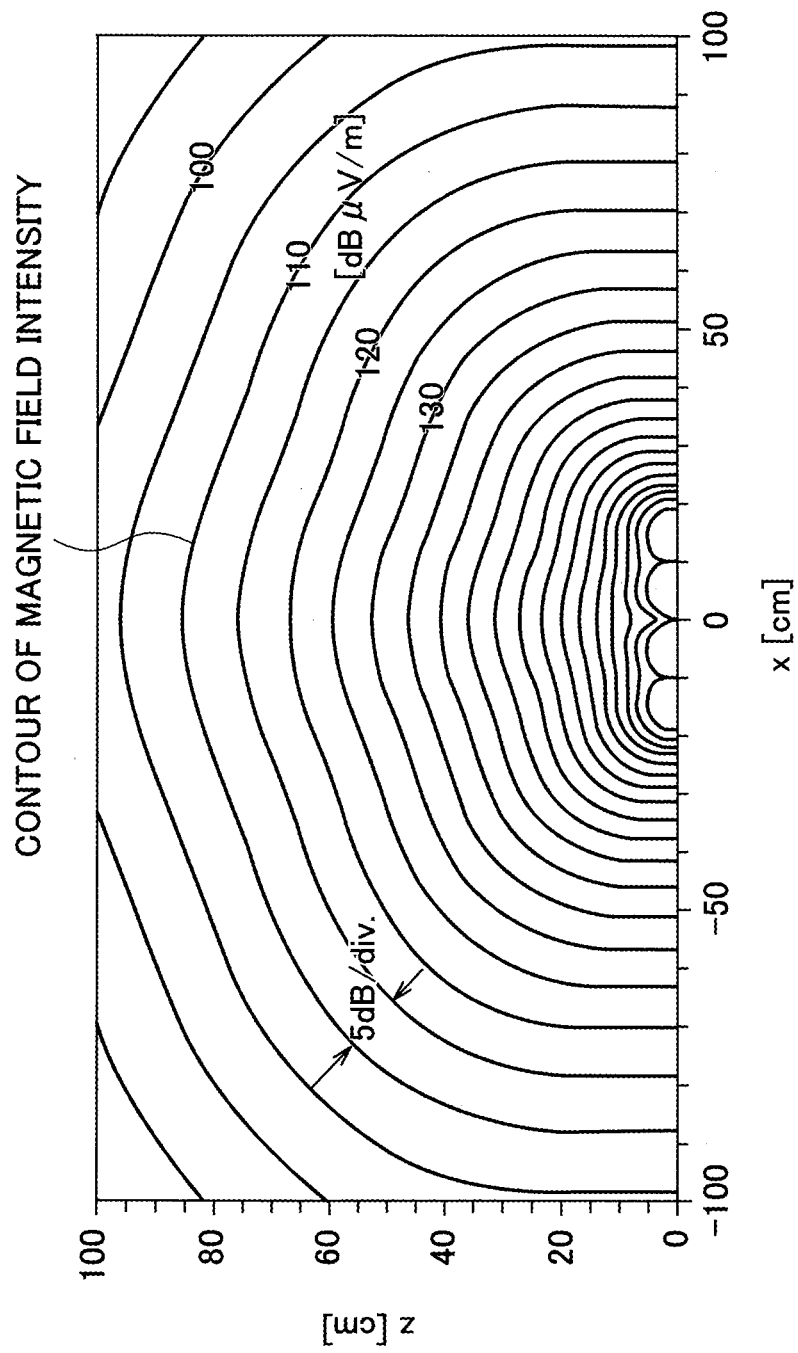
FIG. 5 is a diagram that illustrates distribution of the magnetic field intensity formed by four loop antennas.

FIG. 5 is a diagram that illustrates distribution of the magnetic field intensity formed by those four loop antennas. Contours of the magnetic field intensity are drawn at intervals of 5 dB (5 dB/div).

In FIG. 5, a part of each contour of the magnetic field intensity is linear more than that in the distribution of FIG. 3. That is, it can be seen that there is formed the linear and clear magnetic field area. Thus, the linear and clear boundary of the communication area can be formed by the loop antenna array of FIG. 4.

However, since the configuration of the loop antenna array of FIG. 4 requires four loop antennas, there is a problem that the loop antenna array becomes complicated and expensive.

First Embodiment

Figure 6:
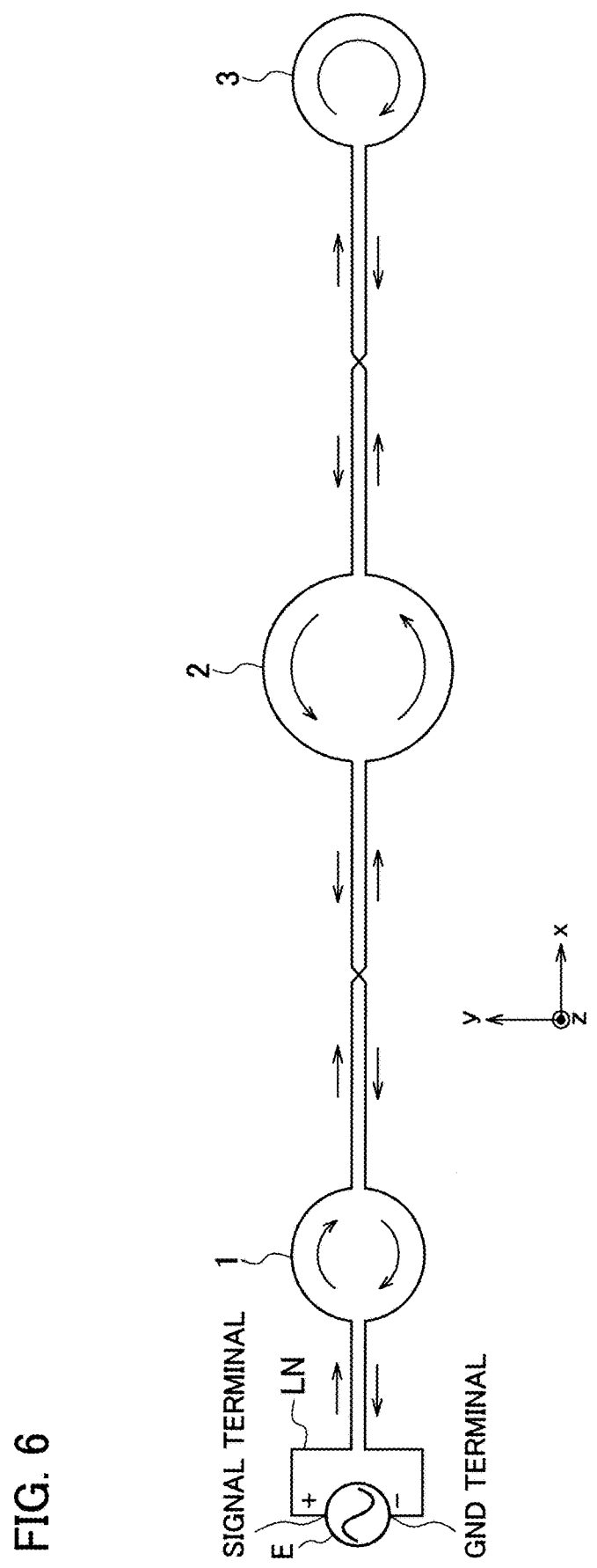
FIG. 6 is a diagram that illustrates an example of a loop antenna array of a first embodiment.

FIG. 6 is a diagram that illustrates an example of a loop antenna array of a first embodiment.

As illustrated in FIG. 6, the loop antenna array of the first embodiment includes loop antennas 1 and 3 arranged in both ends and a loop antenna 2 arranged in the middle. The center of each of the loop antennas 1 to 3 is arranged linearly, and a distance between the centers of the loop antennas 1 and 2 and a distance between the centers of the loop antennas 2 and 3 are the same. That is, the distances between the centers of the adjacent loop antennas are the same.

Each of the loop antennas 1 to 3 is a conductor formed in a loop shape, and is formed on the same surface of an un-illustrated plane board, or on the same plane (an xy-plane in the drawing), for example. Likewise, the later-described loop antenna array can also be formed on the same plane.

The loop antennas 1 to 3 have the same shape, and the shape illustrated in FIG. 6 is a circle, for example. Note that the shape of each of the loop antennas 1 to 3 may be different, and the shape may be other than the circle. This is similar to the later-described loop antenna array.

The numbers of turns of the respective loop antennas 1 to 3 are the same, and the number of turns is one, for example. Note that the number of turns may be two or greater.

For example, areas of regions respectively surrounded by the loop antennas 1 and 3 arranged in both ends are the same, and an area of a region surrounded by the loop antenna 2 arranged in the middle is twice the area of the region surrounded by each of the loop antennas 1 and 3 arranged in both ends.

The loop antennas 1 to 3 are formed of a continuous conductor LN, for example. The + terminal as one end of the conductor LN is connected to the signal terminal of the alternating-current source E, and the – terminal as the other end of the conductor LN is connected to the GND terminal of the alternating-current source E. Since all the loop antennas 1 to 3 are formed of the continuous conductor in this way, all the loop antennas can be supplied with the currents with one alternating-current source E. Note that the magnitude of the current may be set optionally depending on the size of the required communication area.

For example, the conductor LN between the loop antennas 1 and 2 are crossed, and the conductor LN between the loop antennas 2 and 3 are crossed. This makes the direction of the current flowing through the loop antenna 2 arranged in the middle and the direction of the current flowing through each of the loop antennas 1 and 3 arranged in both ends opposite from each other.

That is, in timing when the signal terminal of the alternating-current source E has a positive voltage, as seen from the direction of penetrating through the loop antennas 1 to 3, or from the z-axis direction, clockwise currents flow through the loop antennas 1 and 3 and a counterclockwise current flows through the loop antenna 2. Meanwhile, in timing when the signal terminal of the alternating-current source E has a negative voltage, counterclockwise currents flow through the loop antennas 1 to 3, and a clockwise current flows through the loop antenna 2.

Note that, since all the loop antennas 1 to 3 are formed with the continuous conductor LN, the magnitude of the currents flowing through the loop antennas 1 to 3 is the same.

In general, the amplitude of magnetic field intensity generated in the distance by the loop antenna is proportional to the magnitude (absolute value) m of a magnetic dipole moment vector (hereinafter, called a magnetic moment). That m is obtained from the following equation.

$$m = N \cdot I \cdot S$$

N is the number of turns of the loop antenna, I is the magnitude of the current flowing through the loop antenna, S is the area of the region surrounded by the loop antenna, and the direction of m is a right-screw direction with respect to the rotation direction of the current.

In the first embodiment, the direction of the current flowing through the loop antenna 2 arranged in the middle and the direction of the currents flowing through the loop antennas 1 and 3 arranged in both ends are opposite from each other, the magnitude of the currents flowing through the respective loop antennas 1 to 3 is the same, the numbers of turns of the respective loop antennas 1 to 3 are the same, and the area of the region surrounded by the loop antenna 2 arranged in the middle is twice the area of the region surrounded by each of the loop antennas 1 and 3 arranged in both ends. Thus, the magnitude m of the magnetic moment of the loop antenna 2 arranged in the middle is twice the magnitude m of the magnetic moment of each of the loop antennas 1 and 3 arranged in both ends. Since the direction of the current flowing through the loop antenna 2 arranged in the middle and the direction of the current flowing through each of the loop antennas 1 and 3 arranged in both ends are opposite from each other, the direction of the magnetic moment of the loop antenna 2 arranged in the middle and the direction of the magnetic moment of each of the loop antennas 1 and 3 arranged in both ends are opposite from each other. That is, taking into account of the direction, the sum of the magnetic moments of the loop antennas 1 to 3 is zero. Making the sum of the magnetic moments of the whole loop antenna array zero in this way can reduce the magnetic field intensity in the distance. In other words, this makes it possible to rapidly attenuate the magnetic field in the distance.

The loop antenna array of the first embodiment can be thought as the loop antenna array illustrated in FIG. 4 in which the loop antennas 2A and 2B are replaced with the loop antenna 2. That is, the loop antenna array of the first embodiment is comparable to the loop antenna array of FIG. 4, or the octupole in which the two quadrupoles are aligned in the opposite directions, and an effect comparable to the effect of the loop antenna array of FIG. 4 can be obtained.

The property illustrated as a triple loop in FIG. 2 is the property of the magnetic field intensity formed by the loop antenna array of the first embodiment, and the attenuation rate of magnetic field intensity is 100 dB/dec. That is, the attenuation rate of this magnetic field intensity is comparable to the attenuation rate of magnetic field intensity of the loop antenna of FIG. 4 illustrated as the quad loop. As a result, the clear boundary of the communication area can be formed like the case of the loop antenna array of FIG. 4.

Figure 7:
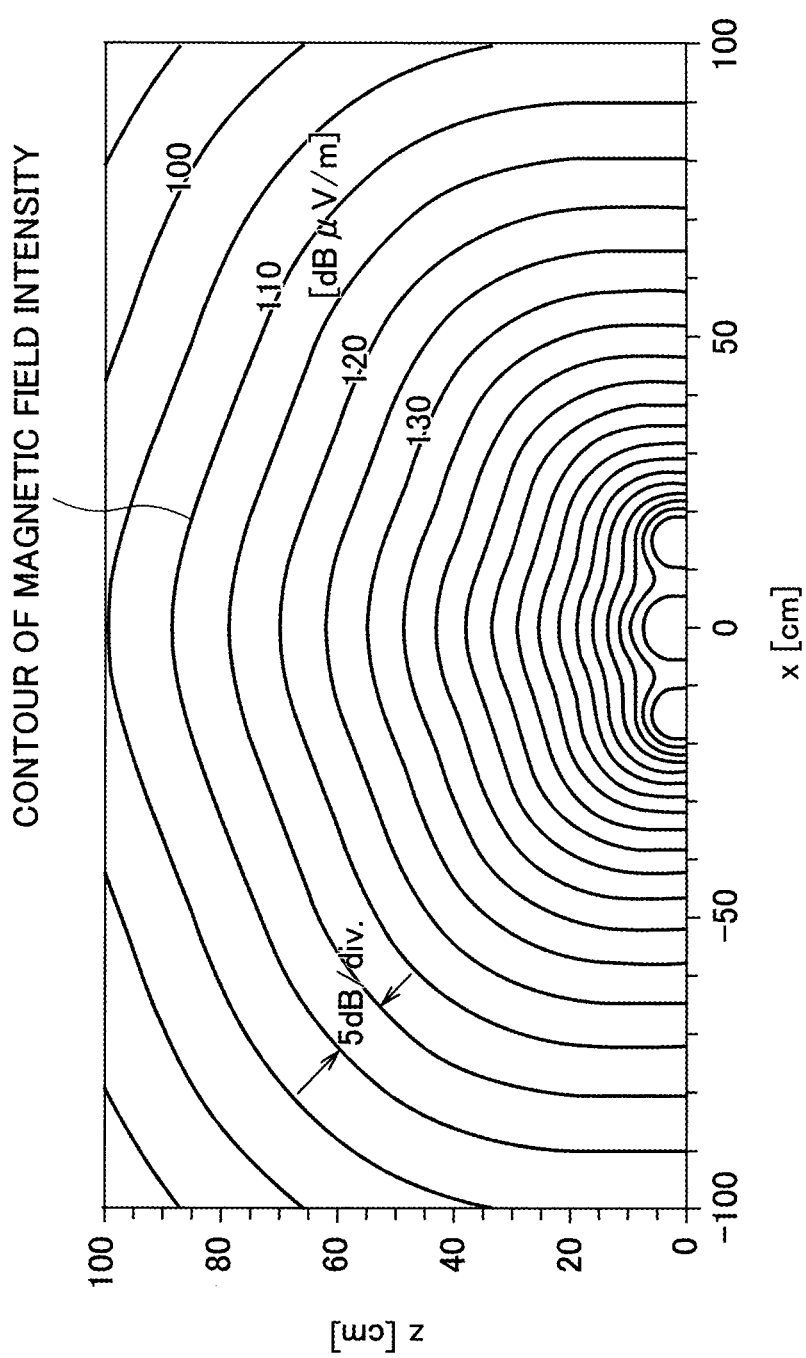
FIG. 7 is a diagram that illustrates distribution of the magnetic field intensity formed by the loop antenna array of the first embodiment.

FIG. 7 is a diagram that illustrates distribution of the magnetic field intensity formed by the loop antenna array of the first embodiment, and the horizontal axis indicates the x-axis direction in FIG. 6 while the vertical axis indicates the z-axis direction in FIG. 6. Contours of the magnetic field intensity are drawn at intervals of 5 dB (5 dB/div). Comparing with the distribution of magnetic field intensity illustrated in FIG. 5, the distribution of magnetic field intensity formed by the loop antenna array of the first embodiment is substantially similar to the distribution of magnetic field intensity illustrated in FIG. 5, and the contours of the magnetic field intensity is partially linear.

While the number of the antennas in the loop antenna array illustrated in FIG. 4 is four, the number of the antennas in the loop antenna array of the first embodiment illustrated in FIG. 6 is three.

Although the number of the antennas is small, the loop antenna array of the first embodiment can form the clear boundary of the communication area similarly to the loop antenna array illustrated in FIG. 4. In addition, the linear boundary of the communication area can be formed. That is, the relatively small number of loop antennas can form the clear boundary of the communication area that one loop antenna cannot form.

As described above, according to the loop antenna array of the first embodiment, the relatively small number of loop antennas can form the clear boundary of the communication area that one loop antenna cannot form. In addition, the linear boundary of the communication area can be formed.

Note that the shape of the distribution of magnetic field intensity does not depend on the shape of the loop antenna. Thus, the shape of the loop antenna may be any one of a circle, a square, a rectangle, an oval, a fan shape, a triangle, a semicircle, a spiral, and a helix. The shape of the loop antenna only has to be a shape that can form the magnetic moment when the current flows. This is similar to the later-described loop antenna array.

Figure 8:
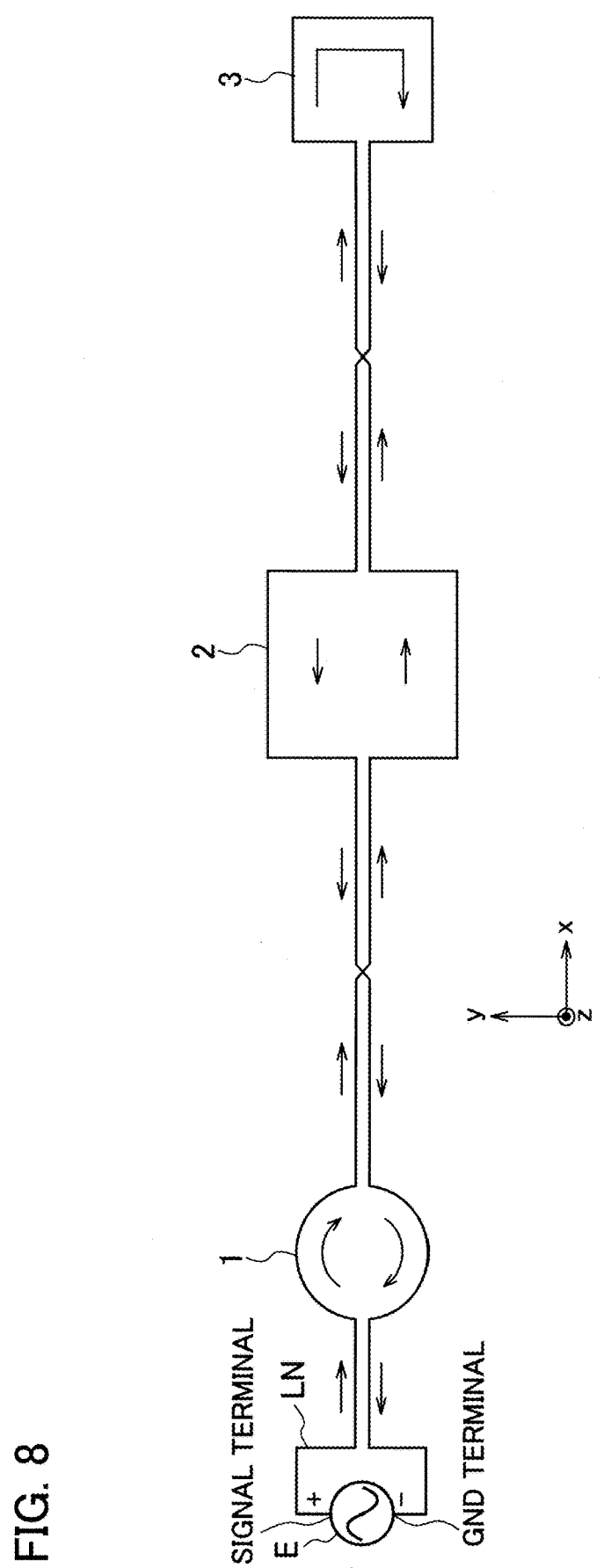
FIG. 8 is a diagram that illustrates an example of a loop antenna array in which the shape of the loop antenna is changed.

For example, as illustrated in FIG. 8, the loop antenna array may allow many shapes such as a circle (e.g., loop antenna 1), a square (e.g., loop antenna 2), and a rectangle (e.g., loop antenna 3) to coexist. That is, the three loop antennas 1 to 3 may either be in the same shape or in different shapes.

Modification 1 of First Embodiment

Figure 9A:
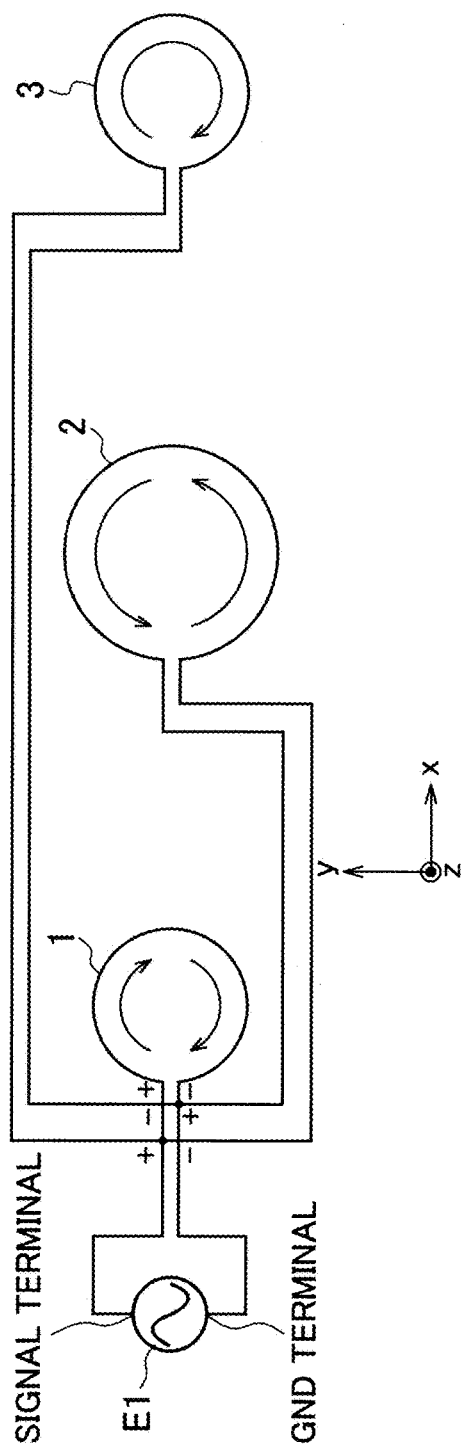
FIGS. 9(a) and 9(b), collectively referred to as FIG. 9, are each a diagram that illustrates an example of a loop antenna array as a modification of the first embodiment.

All the loop antennas may not be necessarily formed of the continuous conductor. This is similar to the later-described loop antenna array. For example, in the first embodiment, the loop antennas 1 to 3 may not be formed of the continuous conductor LN. For example, as illustrated in FIG. 9(a), a pair of the + terminal and the − terminal is provided in each of the loop antennas 1, 2, and 3. Then, the + terminals of the loop antennas 1 and 3 and the − terminal of the loop antenna 2 are connected to the signal terminal of the alternating-current source E, and the − terminals of the loop antennas 1 and 3 and the + terminal of the loop antenna 2 are connected to the GND terminal of the alternating-current source E. In this way, the direction of the current flowing through the loop antenna 2 arranged in the middle and the direction of the currents flowing through the loop antennas 1 and 3 arranged in both ends become opposite from each other. Then, the sum of the magnetic moments becomes zero.

Modification 2 of First Embodiment

Figure 9B:
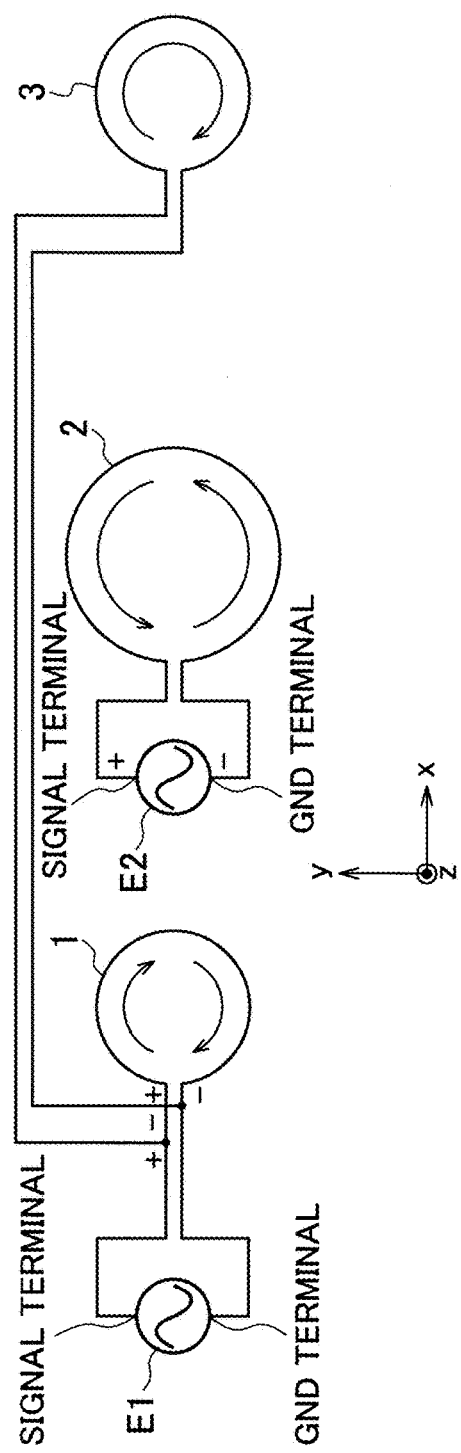

Otherwise, as illustrated in FIG. 9(b), a pair of the + terminal and the − terminal is provided in each of the loop antennas 1, 2, and 3, and two alternating-current sources E1 and E2 are provided. Then, the + terminals of the loop antennas 1 and 3 are connected to the signal terminal of the alternating-current source E1 while the − terminals of the loop antennas 1 and 3 are connected to the GND terminal of the alternating-current source E1, and the + terminal and the − terminal of the loop antenna 2 are respectively connected to the signal terminal and the GND terminal of the alternating-current source E2. When the signal terminal of the alternating-current source E1 has a positive voltage, they are synchronized such that the signal terminal of the alternating-current source E2 has a negative voltage. In this way, the direction of the current flowing through the loop antenna 2 arranged in the middle and the direction of the currents flowing through the loop antennas 1 and 3 arranged in both ends become opposite from each other. Then, the sum of the magnetic moments becomes zero.

Modification 3 of First Embodiment

Figure 10:
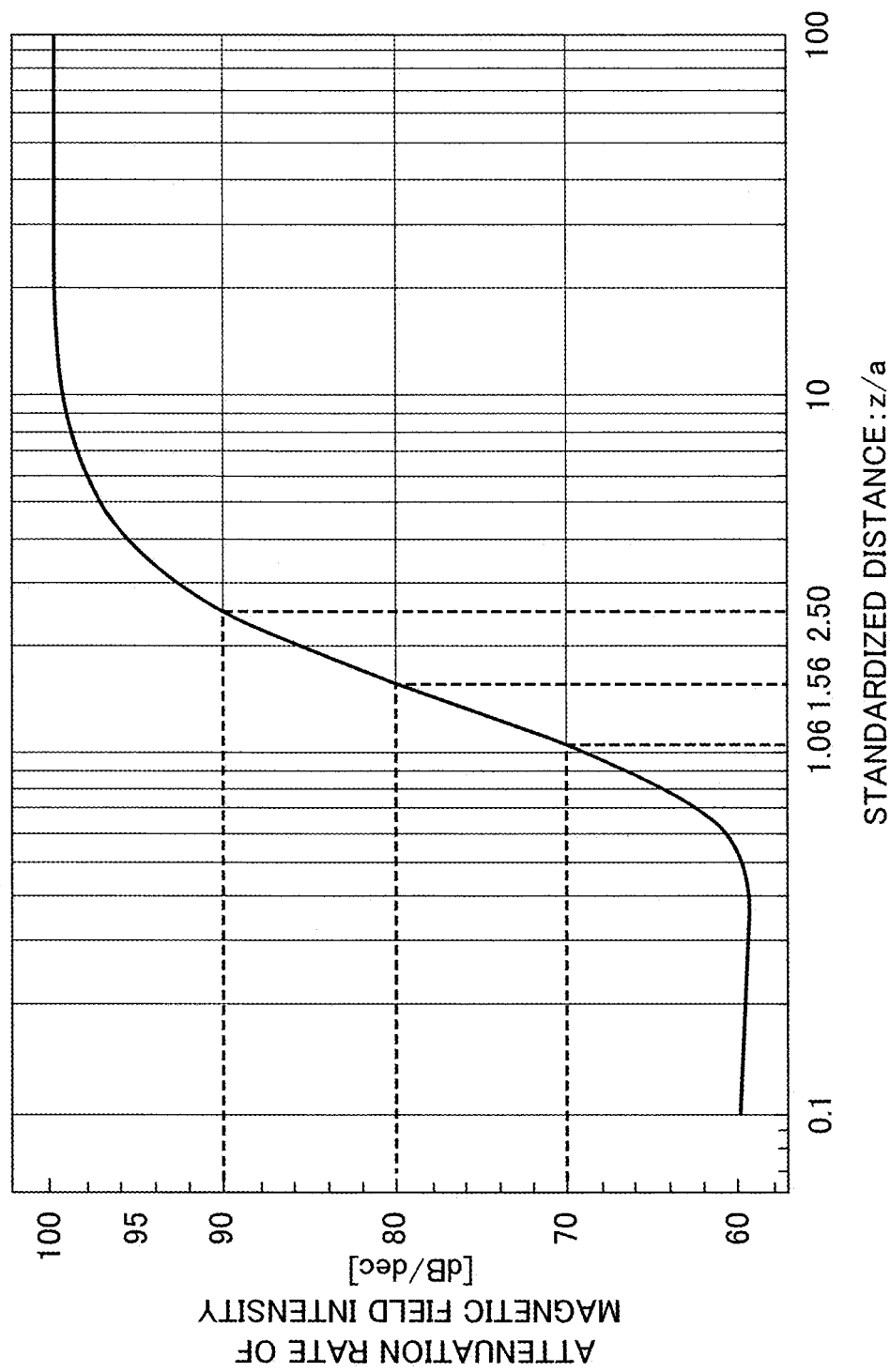
FIG. 10 is a diagram that illustrates relationship between an attenuation rate of magnetic field intensity and a standardized distance in the z-axis direction in the first embodiment.

FIG. 10 is a diagram that illustrates relationship between an attenuation rate of magnetic field intensity and a standardized distance in the z-axis direction in the first embodiment. The vertical axis is the attenuation rate of magnetic field intensity [dB/dec] while the horizontal axis is the standardized distance z/a in the z-axis direction in FIG. 6.

z is a distance (predetermined distance) in the z-axis direction from the center of the loop antenna 2 arranged in the middle in FIG. 6. a is a distance between the center of the loop antenna 2 arranged in the middle and the center of each of the loop antennas 1 and 3 arranged in both ends. That is, the above-described predetermined distance is z, a is the distance between the centers of adjacent loop antennas, and z/a is called the standardized distance.

As illustrated in FIG. 10, when z/a is small, or around the loop antenna array, only the attenuation rate of magnetic field intensity of about 60 dB/dec can be obtained like the case of the loop antenna of FIG. 1. When z/a becomes greater, or as being further from the center the loop antenna array, the attenuation rate of the magnetic field is increased and, eventually, gradually close to 100 dB/dec.

As illustrated in FIG. 10, the attenuation rate of magnetic field intensity of 90 dB/dec or greater can be obtained in a range of z/a≥2.50. In addition, the attenuation rate of magnetic field intensity of 70 dB/dec or greater can be obtained in a range of z/a≥1.06. Thus, when 90 dB/dec or greater is required, a should be set such that z/a≥2.50, and when 70 dB/dec or greater is required, a should be set such that z/a≥1.06.

It is known that the attenuation rate of magnetic field intensity becomes gradually close to 80 dB/dec in a loop antenna array (double loop) including two loop antennas of FIG. 1. That is, the attenuation rate of magnetic field intensity cannot be greater than 80 dB/dec in the double loop.

In the loop antenna array of the first embodiment, this attenuation rate of magnetic field intensity of 80 dB/dec can be obtained when z/a=1.56. That is, if a is set at least such that z/a≥1.6 in the loop antenna array of the first embodiment, the maximum value of the attenuation rate of magnetic field intensity that can be obtained with the double loop, or the attenuation rate of magnetic field intensity of 80 dB/dec or greater, can be obtained.

Thus, in the first embodiment, in a case where the attenuation rate of magnetic field intensity of 80 dB/dec or greater at a position having the predetermined distance z from the center of the loop antenna 2 arranged in the middle is required, a only has to be set such that z/a≥1.6. Arrangement of each loop antenna to which a (i.e., a distance between the centers of adjacent loop antennas) is set such that z/a≥1.6 makes it possible to obtain the attenuation rate of magnetic field intensity of 80 dB/dec at the above-described position. Thus, a clearer boundary of the communication area can be formed.

Note that, also in the later-described loop antenna array, it is preferable to set a so as to achieve this relationship (z/a≥1.6) when the attenuation rate of magnetic field intensity of 80 dB/dec is required.

Second Embodiment

FIG. 11 (*a*) is a diagram that illustrates an example of a loop antenna array of a second embodiment. FIG. 11 (*b*) is a diagram that illustrates an example of a loop antenna array of a comparative example of the second embodiment.

In the first embodiment, the sum of the magnetic moments is made zero by making the area of the region surrounded by the loop antenna 2 arranged in the middle twice the area of the region surrounded by each of the loop antennas 1 and 3 arranged in both ends.

On the other hand, in the loop antenna array of the second embodiment illustrated in FIG. 11 (*a*), the sum of the magnetic moments is made zero by making the number of turns of the loop antenna 2 arranged in the middle equal to the sum of the numbers of turns of the loop antennas 1 and 3 arranged in both ends.

For example, the number of turns of the loop antenna 2 arranged in the middle is two, and each number of turns of the loop antennas 1 and 3 arranged in both ends is one. Note that the numbers of turns are not limited to the above-mentioned values as long as the number of turns of the loop antenna 2 arranged in the middle is equal to the sum of the numbers of turns of the loop antennas 1 and 3 arranged in both ends.

As described above, in the second embodiment, the areas of the regions respectively surrounded by the loop antennas 1 to 3 are the same, the magnitude of the currents flowing through the respective loop antennas 1 to 3 is the same, and the number of turns of the loop antenna 2 arranged in the middle is equal to the sum of the numbers of turns of the loop antennas 1 and 3 arranged in both ends. As a result, the sum of the magnetic moments becomes zero.

Although the example illustrated in FIG. 11 (*a*) has the square loop antenna, each loop antenna may have a different shape. In addition, the value of the area may be set optionally as long as the areas of the regions respectively surrounded by the loop antennas 1 to 3 are the same.

Moreover, the magnitude of the currents may be set optionally as long as the magnitude of the currents flowing through the respective loop antennas 1 to 3 is the same.

The loop antenna array of the second embodiment can be thought as the loop antenna array illustrated in FIG. 11(*b*) in which the loop antennas 2A and 2B are replaced with the loop antenna 2. While the number of the antennas in the loop antenna array illustrated in FIG. 11 (*b*) is four, the number of the antennas in the loop antenna array of the second embodiment illustrated in FIG. 11 (*a*) is three.

In the second embodiment, although the number of the antennas is small, the sum of the magnetic moments is zero, and the similar action effects as that of the first embodiment can be obtained. Thus, the relatively small number of loop antennas can form the clear boundary of the communication area that one loop antenna cannot form. In addition, the linear boundary of the communication area can be formed.

Third Embodiment

Figure 12:
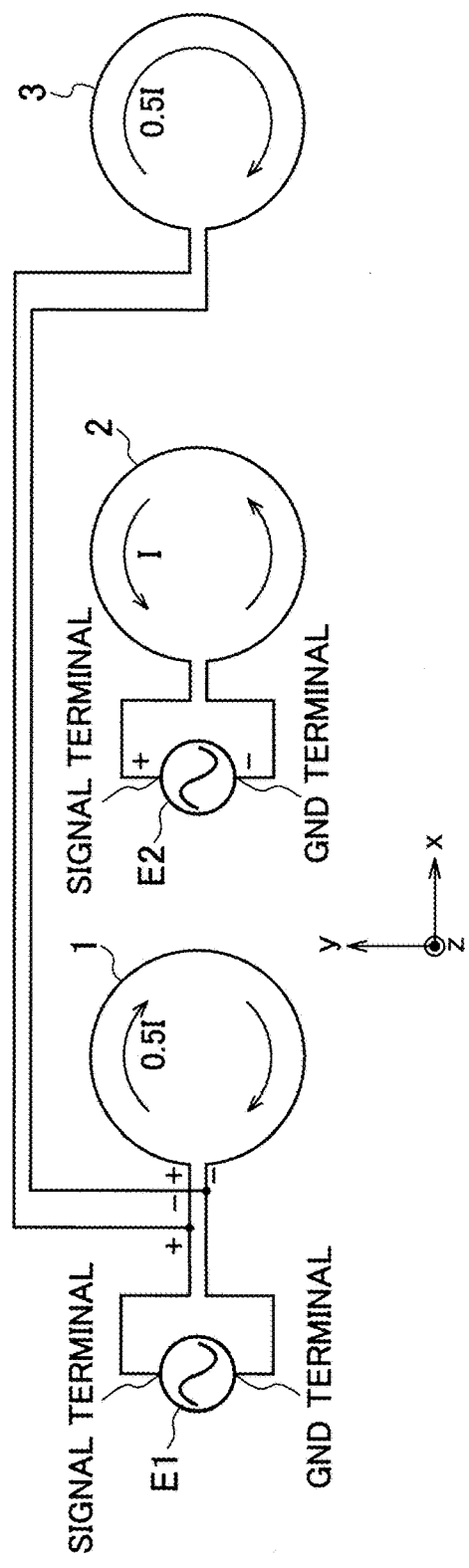
FIG. 12(a) is a diagram that illustrates an example of a loop antenna array of a third embodiment.
FIG. 12(b) is a diagram that illustrates an example of a loop antenna array of a modification of the third embodiment.
Figure 12:
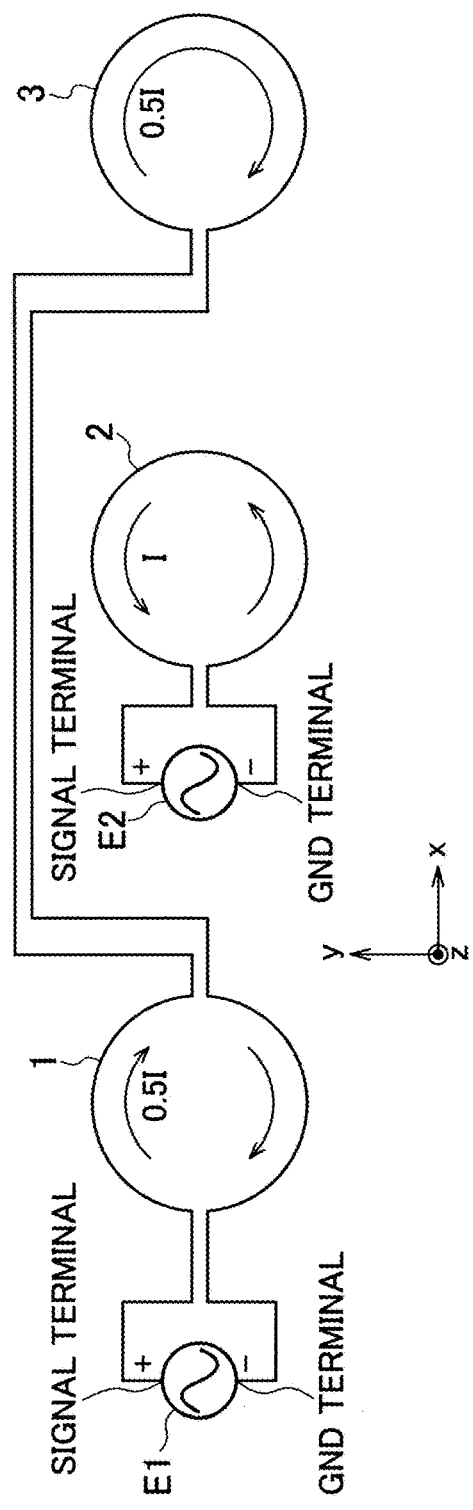

FIG. 12 (*a*) is a diagram that illustrates an example of a loop antenna array of a third embodiment. FIG. 12(*b*) is a diagram that illustrates an example of a loop antenna array of a modification example of the third embodiment.

In the first embodiment, the sum of the magnetic moments is made zero by making the area of the region surrounded by the loop antenna 2 arranged in the middle twice the area of the region surrounded by each of the loop antennas 1 and 2 arranged in both ends.

On the other hand, in the loop antenna array of the third embodiment illustrated in FIG. 12(*a*), the sum of the magnetic moments is made zero by making the magnitude of the current flowing through the loop antenna 2 arranged in the middle twice the magnitude of each of the currents flowing though the loop antennas 1 and 3 arranged in both ends.

In the third embodiment, as illustrated in FIG. 12(*a*), a pair of the + terminal and the − terminal is provided in each of the loop antennas 1, 2, and 3, and two alternating-current sources E1 and E2 are provided, for example. The + terminals of the loop antennas 1 and 3 are connected to the signal terminal of the alternating-current source E1 while the − terminals of the loop antennas 1 and 3 are connected to the GND terminal of the alternating-current source E1. The + terminal and the − terminal of the loop antenna 2 are respectively connected to the signal terminal and the GND terminal of the alternating-current source E2. Then, when the signal terminal of the alternating-current source E1 has a positive voltage, they are synchronized such that the signal terminal of the alternating-current source E2 has a negative voltage. In this way, the direction of the current flowing through the loop antenna 2 arranged in the middle and the direction of the currents flowing through the loop antennas 1 and 3 arranged in both ends become opposite from each other.

For example, when a current of magnitude I flows through the loop antenna 2, a current of magnitude 0.5 I flows through each of the loop antennas 1 and 3. This makes the sum of the magnetic moments zero.

That is, in the third embodiment, the numbers of turns of the respective loop antennas 1 to 3 are the same, the areas of the regions respectively surrounded by the loop antennas 1 to 3 are the same, and the magnitude of the current flowing through the loop antenna 2 arranged in the middle is twice the magnitude of the current flowing through each of the loop antennas 1 and 3 arranged in both ends.

Note that the magnitude of the current may be set optionally as long as the magnitude of the current flowing through the loop antenna 2 arranged in the middle is twice the magnitude of the current flowing through each of the loop antennas 1 and 3 arranged in both ends.

In addition, the value of the area may be set optionally as long as the areas of the regions respectively surrounded by the loop antennas 1 to 3 are the same.

Moreover, the number of turns may be set optionally as long as the numbers of turns of the respective loop antennas 1 to 3 are the same.

According to the loop antenna array of the third embodiment, the sum of the magnetic moments is zero, and the similar action effects as that of the first embodiment can be obtained. That is, the relatively small number of loop antennas can form the clear boundary of the communication area that one loop antenna cannot form. In addition, the linear boundary of the communication area can be formed.

Modification of Third Embodiment

Note that, as illustrated in FIG. 12(*b*), the loop antennas 1 and 3 may be formed of the continuous conductor, for example. The + terminal as one end of the conductor is connected to the signal terminal of the alternating-current source E1, and the − terminal as the other end of the conductor is connected to the GND terminal of the alternating-current source E1.

Fourth Embodiment

Figure 13:
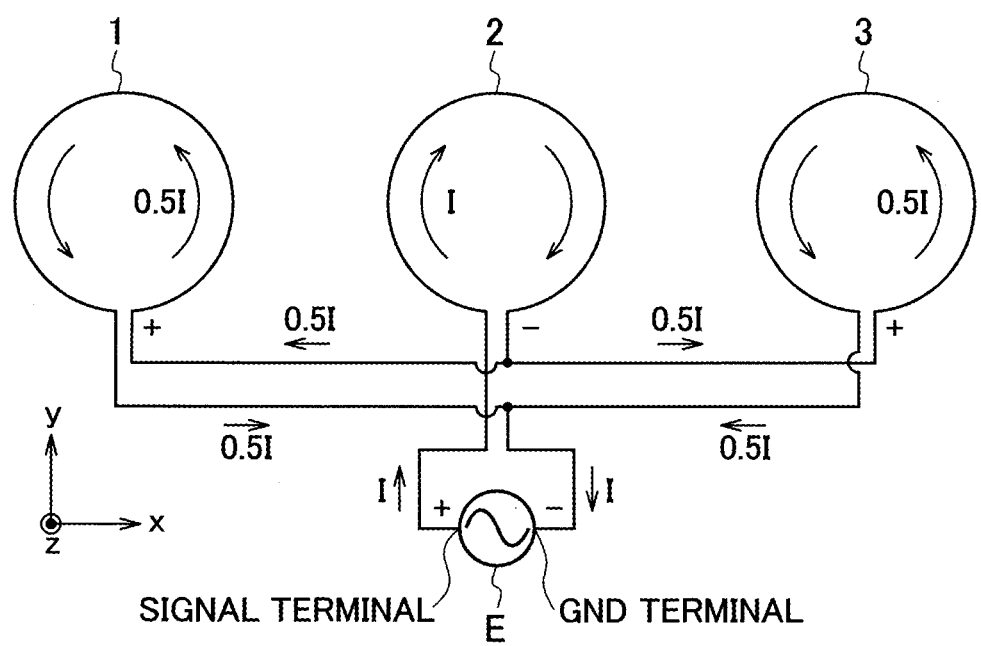
FIG. 13 is a diagram that illustrates an example of a loop antenna array of a fourth embodiment.

FIG. 13 is a diagram that illustrates an example of a loop antenna array of a fourth embodiment.

In the third embodiment, the alternating-current source E1 supplies the currents to the loop antennas 1 and 3 arranged in both ends, and the alternating-current source E2 supplies the current to the loop antenna 2 arranged in the middle.

On the other hand, in the fourth embodiment, the alternating-current source E supplies the current to the loop antenna 2 arranged in the middle, and the current flowing through the loop antenna 2 diverges and flows into each of the loop antennas 1 and 3 arranged in both ends.

For example, a pair of the + terminal and the − terminal is provided in each of the loop antennas 1, 2, and 3, and the alternating-current source E is provided. Then, the + terminal of the loop antenna 2 is connected to the signal terminal of the alternating-current source E, and the − terminal of the loop antenna 2 is connected to the + terminals of the loop antennas 1 and 3. Then, the − terminals of the loop antennas 1 and 3 are connected to the GND terminal of the alternating-current source E.

For example, when the current of magnitude I flows through the loop antenna 2, this current diverges into each of the loop antennas 1 and 3, and then the current of magnitude 0.5 I flows through each of the loop antennas 1 and 3. That is, the magnitude of the current flowing through the loop antenna 2 arranged in the middle is twice the magnitude of the current flowing through each of the loop antennas 1 and 3 arranged in both ends.

In the fourth embodiment, the sum of the magnetic moments is zero, and the similar action effects as that of the second embodiment can be obtained. That is, the relatively small number of loop antennas can form the clear boundary of the communication area that one loop antenna cannot form. In addition, the linear boundary of the communication area can be formed.

In addition, since the current flowing through the loop antenna 2 arranged in the middle diverges and flows into each of the loop antennas 1 and 3 arranged in both ends, the loop antennas can be supplied with the currents with one alternate-current source E.

Fifth Embodiment

FIG. 14 (*a*) is a diagram that illustrates an example of a loop antenna array of a fifth embodiment. FIG. 14(*b*) is a diagram that illustrates an example of a loop antenna array of a comparative example of the fifth embodiment.

As illustrated in FIG. 14(*a*), the loop antenna array of the fifth embodiment includes two loop antenna arrays of the second embodiment illustrated in FIG. 11 (each loop antenna array includes three loop antennas 1 to 3).

Specifically, the loop antenna array of the fifth embodiment includes the first power of 2 loop antenna arrays of the second embodiment. If n is set to an integer of 1 or greater, the number of the loop antenna array is the nth power of 2. That is, the loop antenna array of the fifth embodiment indicates the nth power of 2 loop antenna arrays in a case where n=1. For example, the loop antennas are arranged linearly.

For example, the loop antennas are formed of the continuous conductor LN. The + terminal as one end of the conductor LN is connected to the signal terminal of the alternating-current source E, and the − terminal as the other end of the conductor LN is connected to the GND terminal of the alternating-current source E. Since all the loop antennas are formed of the continuous conductor LN, the loop antennas can be supplied with the currents with one alternating-current source E.

Here, a group of the (n−1)th power of 2 loop antenna arrays is a unitary loop antenna array. With this, in a case where n=1, the 0th power of 2 (one) loop antenna array is the unitary loop antenna array. For example, a loop antenna array on the left side of FIG. 14 (*a*) (loop antennas 1 to 3) is a first unitary loop antenna array A1, and a loop antenna array on the right side of FIG. 14 (*a*) (loop antennas 1 to 3) is a second unitary loop antenna array A2. The first unitary loop antenna array and the second unitary loop antenna array can be opposite.

The direction of the current flowing through the loop antenna arranged on one end (e.g., the loop antenna 1 on the left end) in the first unitary loop antenna array A1 and the direction of the current flowing through the loop antenna arranged on the same position as the above-mentioned one end (the same left end) (e.g., the loop antenna 1 on the left end) in the second unitary loop antenna array A2 are opposite from each other. Also in the fifth embodiment, the sum of the magnetic moments becomes zero.

The loop antenna array of the fifth embodiment is comparable to the 16-pole in which the octupoles like the loop antenna array of FIG. 6 are arranged in the opposite directions, and its attenuation rate of magnetic field intensity is 120 dB/dec, which is greater than 100 dB/dec obtained by the octupole.

That is, according to the loop antenna array of the fifth embodiment, it is possible to form the boundary of the communication area clearer than the boundary of the communication area formed by the loop antenna arrays of the first to fourth embodiments.

The loop antenna array of the fifth embodiment can be thought as the loop antenna array illustrated in FIG. 14(*b*) in which the loop antennas 2A and 2B are replaced with the loop antenna 2.

While the number of the antennas in the loop antenna array illustrated in FIG. 14(*b*) is eight, the number of the antennas in the loop antenna array of the fifth embodiment illustrated in FIG. 14(*a*) is six.

In the fifth embodiment, although the number of the antennas is small, the sum of the magnetic moments is zero, and the similar action effects as that of the loop antenna array illustrated in FIG. 14(*b*) can be obtained. Thus, the relatively small number of loop antennas can form the clear boundary of the communication area. In addition, the linear boundary of the communication area can be formed.

Sixth Embodiment

Figure 15:
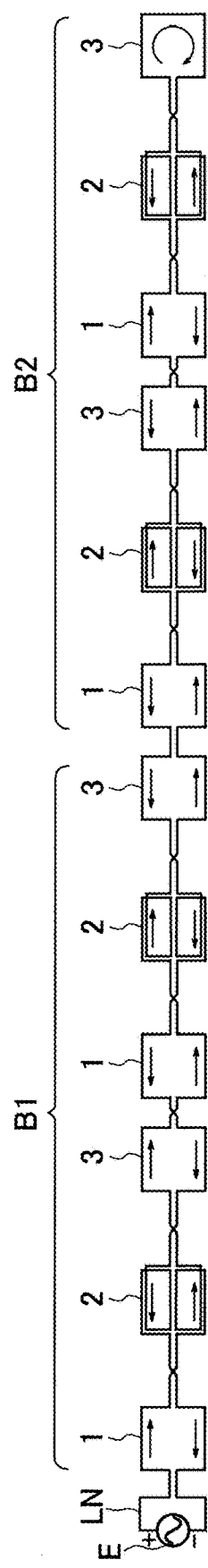
FIG. 15(a) is a diagram that illustrates an example of a loop antenna array of a sixth embodiment.
FIG. 15(b) is a diagram that illustrates an example of a loop antenna array of a comparative example of the sixth embodiment.
Figure 15:
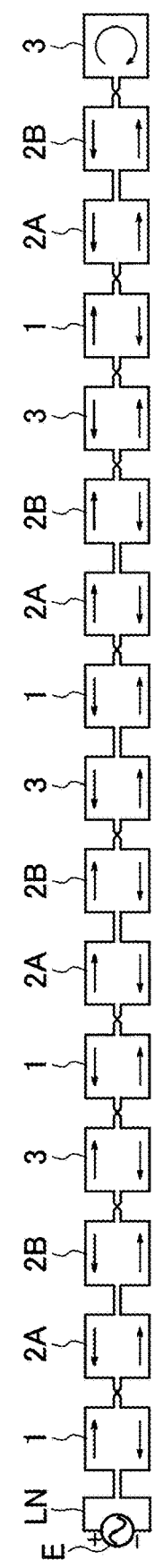

FIG. 15(*a*) is a diagram that illustrates an example of a loop antenna array of a sixth embodiment. FIG. 15(*b*) is a diagram that illustrates an example of a loop antenna array of a comparative example of the sixth embodiment.

As illustrated in FIG. 15(*a*), the loop antenna array of the sixth embodiment includes four loop antenna arrays of the second embodiment (each loop antenna array includes three loop antennas).

Specifically, the loop antenna array of the sixth embodiment includes the second power of 2 loop antenna arrays of the second embodiment. If n is set to an integer of 1 or greater, the number of the loop antenna array is the nth power of 2. That is, the loop antenna array of the sixth embodiment indicates the nth power of 2 loop antenna arrays in a case where n=2. For example, the loop antennas are arranged linearly.

In addition, it can be said that the loop antenna array of the sixth embodiment includes two loop antenna arrays of the fifth embodiment (each loop antenna array includes six loop antennas).

For example, the loop antennas are formed of the continuous conductor LN. The + terminal as one end of the conductor LN is connected to the signal terminal of the alternating-current source E, and the − terminal as the other end of the conductor LN is connected to the GND terminal of the alternating-current source E. Since all the loop antennas are formed of the continuous conductor LN, the loop antennas can be supplied with the currents with one alternating-current source E.

Similar to the fifth embodiment, a group of the (n−1)th power of 2 (in the sixth embodiment, n=2) loop antenna arrays, or the first power of 2 (two) loop antenna arrays, is a unitary loop antenna array. For example, a loop antenna array on the left side of FIG. 15(*a*) (six loop antennas) is a first unitary loop antenna array B1, and a loop antenna array on the right side of FIG. 15(*a*) (six loop antennas) is a second unitary loop antenna array B2. The first unitary loop antenna array and the second unitary loop antenna array can be opposite.

The direction of the current flowing through the loop antenna on one end (e.g., the loop antenna 1 on the left end) in the first unitary loop antenna array B1 and the direction of the current flowing through the loop antenna arranged on the same position as the above-mentioned one end (the same left end) (e.g., the loop antenna 1 on the left end) in the second unitary loop antenna array B2 are opposite from each other. Also in the sixth embodiment, the sum of the magnetic moments becomes zero.

The loop antenna array of the sixth embodiment is comparable to the 32-pole in which the 16-poles comparable to the loop antenna array of the fifth embodiment are arranged in the opposite directions. The attenuation rate of magnetic field intensity of the loop antenna array of the sixth embodiment is 140 dB/dec, which is greater than 120 dB/dec of the attenuation rate of magnetic field intensity of the fifth embodiment.

That is, according to the loop antenna array of the sixth embodiment, it is possible to form the boundary of the communication area clearer than the boundary of the communication area formed by the loop antenna array of the fifth embodiment.

The loop antenna array of the sixth embodiment can be thought as the loop antenna array illustrated in FIG. 15(*b*) in which the loop antennas 2A and 2B are replaced with the loop antenna 2.

While the number of the antennas in the loop antenna array illustrated in FIG. 15 (*b*) is 16, the number of the antennas in the loop antenna array of the sixth embodiment illustrated in FIG. 15 (*a*) is 12.

In the sixth embodiment, although the number of the antennas is small, the sum of the magnetic moments is zero, and the similar action effects as that of the loop antenna array illustrated in FIG. 15(*b*) can be obtained. Thus, the relatively small number of loop antennas can form the clear boundary of the communication area. In addition, the linear boundary of the communication area can be formed.

Note that, although n=1 in the fifth embodiment and n=2 in the sixth embodiment, n may be an integer of 3 or greater. Also in this case, when the nth power of 2 loop antenna arrays are provided and a group of the (n−1) th power of 2 loop antenna arrays is the unitary loop antenna array, the direction of the current flowing through the loop antenna arranged on one end in the first unitary loop antenna array and the direction of the current flowing through the loop antenna arranged on the same position as the above-mentioned one end in the second unitary loop antenna array just have to be opposite from each other.

Seventh Embodiment

Figure 16:
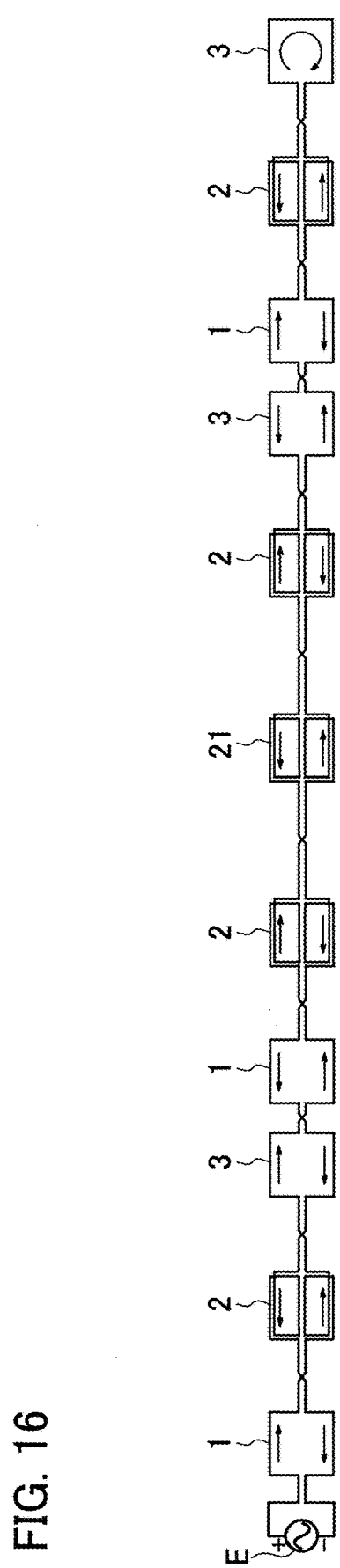
FIG. 16 is a diagram that illustrates an example of a loop antenna array of a seventh embodiment.

FIG. 16 is a diagram that illustrates an example of a loop antenna array of a seventh embodiment.

The loop antenna array of the seventh embodiment is the loop antenna array of the sixth embodiment in which adjacent two loop antennas through which currents flow in the same direction are replaced with one loop antenna through which currents flow in the same direction as that of the mentioned currents and in which the magnitude of the magnetic moment is twice the magnetic moment of each of the concerned adjacent loop antennas.

For example, in FIG. 15(a), the loop antenna 3 on the right end of the first unitary loop antenna array B1 and the loop antenna 1 on the left end of the second unitary loop antenna array B2 are next to each other, and additionally, the direction of the currents is the same.

Instead of these loop antennas 1 and 3, the loop antenna array of the seventh embodiment includes one loop antenna 21 through which the currents flow in the same direction and in which the magnitude of the magnetic moment is twice the magnetic moment of each of the loop antennas 1 and 3.

For example, as illustrated in FIG. 16, the number of turns of the loop antenna 21 is equal to the sum of the numbers of turns of the loop antennas 1 and 3. In addition, the areas of the regions respectively surrounded by the loop antennas 1, 3, and 21 are the same, and the magnitude of the currents flowing through the respective loop antennas 1, 3, and 21 are the same.

Thus, the magnetic moment of the loop antenna 21 becomes the sum of the magnetic moments of the loop antennas 1 and 3. Also in the seventh embodiment, the sum of the magnetic moments becomes zero.

The loop antenna array of the seventh embodiment is comparable to the 32-pole in which the 16-poles are arranged in the opposite directions, and its attenuation rate of magnetic field intensity is greater than the attenuation rate of magnetic field intensity of the fifth embodiment.

That is, according to the loop antenna array of the seventh embodiment, it is possible to form the boundary of the communication area clearer than the boundary of the communication area formed by the loop antenna array of the fifth embodiment.

In addition, the replacement of the loop antennas 1 and 3 with the loop antenna 21 makes it possible to reduce the number of the loop antennas.

Note that such replacement of the loop antennas may be performed not only in the loop antenna array of the sixth embodiment in which n=2, but also in an embodiment where n is 3 or greater.

In addition, in the fifth to seventh embodiments, the loop antennas may not be formed of the continuous conductor, and different conductors may be used as the case of FIG. 9 and the like, for example.

Moreover, the magnitude of the currents flowing through the respective loop antennas 1 to 3 may be the same, the numbers of turns of the respective loop antennas 1 to 3 may be the same, and the area of the region surrounded by the loop antenna 2 may be twice the area of the region surrounded by each of the loop antennas 1 and 3.

Further, the magnitude of the current flowing through the loop antenna 2 may be twice the magnitude of the current flowing through each of the loop antennas 1 and 3, the numbers of turns of the respective loop antennas 1 to 3 may be the same, and the areas of the regions respectively surrounded by the loop antennas 1 to 3 may be the same.

As described above, the embodiments of the present invention have been disclosed. However, it should not be understood that the description and drawings which constitute part of this disclosure limit the present invention. From this disclosure, various alternative embodiments, examples, and operation techniques will be easily found by those skilled in the art.

EXPLANATION OF THE REFERENCE NUMERALS 1, 2, 2A, 2B, 21, 3 loop antenna
A1, A2, B1, B2 unitary loop antenna array
E, E1, E2 alternating-current source
LN conductor
z/a standardized distance

The invention claimed is:

1. A loop antenna array comprising three loop antennas, wherein
the loop antenna array is used for wireless communication using a magnetic field,
a direction of a current flowing through the loop antenna arranged in a middle and a direction of a current flowing through each of the loop antennas arranged in both sides are opposite from each other,
areas of regions respectively surrounded by the loop antennas are the same, and
the current flowing through the loop antenna arranged in the middle diverges equally and flows into each of the loop antennas arranged in both sides.

2. The loop antenna array according to claim 1, wherein in a case where an attenuation rate of magnetic field intensity of 80 dB/dec or greater at a position having a predetermined distance from a center of the loop antenna arranged in the middle is required, assuming that the predetermined distance is z while a distance between centers of the adjacent two loop antennas is a, a is set such that $z/a \geq 1.6$.

3. The loop antenna array according to claim 1, wherein all the loop antennas are arranged on a same plane.

4. The loop antenna array according to claim 1, wherein a shape of each of the loop antennas is any one of a square, a circle, a rectangle, an oval, a fan shape, a triangle, a semicircle, a spiral, and a helix.

5. The loop antenna array according to claim 1, wherein all the loop antennas are formed of a continuous conductor.

6. The loop antenna array according to claim 1, wherein centers of all the loop antennas are arranged linearly.

7. The loop antenna array according to claim 1, wherein magnitudes of magnetic moments of the loop antennas arranged in both sides are same, and
a magnitude of the magnetic moment of the loop antenna arranged in the middle is twice the magnitude of the magnetic moment of each of the loop antennas arranged in both sides.

8. A loop antenna array, comprising:

nth power of 2 (n is an integer of 1 or greater) loop antenna arrays, wherein for each of the loop antenna arrays:

the loop antenna array comprises three loop antennas, a direction of a current flowing through the loop antenna arranged in a middle and a direction of a current flowing through each of the loop antennas arranged in both sides are opposite from each other, areas of regions respectively surrounded by the loop antennas are the same, and the current flowing through the loop antenna arranged in the middle diverges equally and flows into each of the loop antennas arranged in both sides, when a group of the (n−1)th power of 2 loop antenna arrays is a unitary loop antenna array, a direction of the current flowing through the loop antenna arranged on one end in a first unitary loop antenna array and a direction of the current flowing through the loop antenna arranged on a same position as that one end in a second unitary loop antenna array are opposite from each other.

9. A loop antenna array comprising:

at least 2 loop antenna arrays, wherein for each of the loop antenna arrays:

the loop antenna array comprises three loop antennas, a direction of a current flowing through the loop antenna arranged in a middle and a direction of a current flowing through each of the loop antennas arranged in both sides are opposite from each other, areas of regions respectively surrounded by the loop antennas are the same, and the current flowing through the loop antenna arranged in the middle diverges equally and flows into each of the loop antennas arranged in both sides, and a 5 loop antenna array arranged between two of the at least 2 loop antenna arrays, wherein current flows through the loop antenna arranged in a middle of the 5 loop antenna array and the loop antennas arranged at a first end and a second end of the 5 loop antenna array in a same direction, current flows through the loop antenna arranged in the middle of the 5 loop antenna array and the loop antennas arranged at both sides of the loop antenna arranged in the middle in opposite directions, a magnetic moment of the loop antenna arranged in the middle of the 5 loop antenna array and the loop antennas arranged at both side of the loop antenna arranged in the middle are twice a magnetic moment of each of the loop antennas arranged at the first and second ends of the 5 loop antenna array, and a direction of the current flowing through the loop antenna arranged at the first end of the 5 loop antenna array and a direction of the current flowing through the loop antenna arranged on a same position as the first end in an adjacent loop antenna array are opposite from each other, and a direction of the current flowing through the loop antenna arranged at the second end of the 5 loop antenna array and a direction of the current flowing through the loop antenna arranged on a same position as the second end in an adjacent loop antenna array are opposite from each other.

\* \* \* \* \*